United States Patent
Cosman et al.

(10) Patent No.: US 6,376,625 B1
(45) Date of Patent: Apr. 23, 2002

(54) PROCESS FOR PURIFYING POLYETHERS

(75) Inventors: James P. Cosman, Sarnia (CA); Paul D. Bettge, Lake Jackson, TX (US); Richard J. Elwell, Terneuzen (NL); Raymond A. Plepys, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/383,171

(22) Filed: Aug. 25, 1999

(51) Int. Cl.[7] .................................................. C08F 2/08
(52) U.S. Cl. ........................ 526/67; 526/62; 526/344.2
(58) Field of Search ............................... 526/62, 344.2, 526/67

(56) References Cited

U.S. PATENT DOCUMENTS

| | | | |
|---|---|---|---|
| 4,482,750 A | 11/1984 | Hetzel et al. | 568/621 |
| 4,902,834 A | 2/1990 | Otten et al. | 568/608 |
| 4,904,392 A * | 2/1990 | Dahlquist | 210/708 |
| 5,545,712 A | 8/1996 | Tsutsui et al. | 528/408 |

FOREIGN PATENT DOCUMENTS

| | | | |
|---|---|---|---|
| JP | 7070308 | 3/1995 | |
| WO | 96/20972 | 7/1996 | .......... C08G/65/30 |
| WO | WO 96/20972 | * 7/1996 | |

* cited by examiner

*Primary Examiner*—David W. Wu
*Assistant Examiner*—William Cheung

(57) ABSTRACT

This invention involves several ways for improving a coalescing process for purifying a crude polyether. In one aspect, particulate zirconium dioxide is selected as a coalescing medium. In a second aspect, alkali metal catalyst is recovered and recycled to make additional polyether product. In a third aspect, a polyether stream obtained from the coalescing step is purified by stripping water in at least two phases, the first of which involves moderate conditions so that water but not allyl alcohol or higher molecular weight impurities are removed from the polyether, and the second of which involves more stringent stripping conditions. In a fourth aspect, crude polyether that is subjected to a holding period before undergoing a coalescing step is mixed with water to minimize the formation of impurities that are believed to compatibilize the aqueous and polyether phases. In a fifth aspect, the coalescing process is conducted under a non-oxidizing atmosphere.

11 Claims, 1 Drawing Sheet

Figure 1:
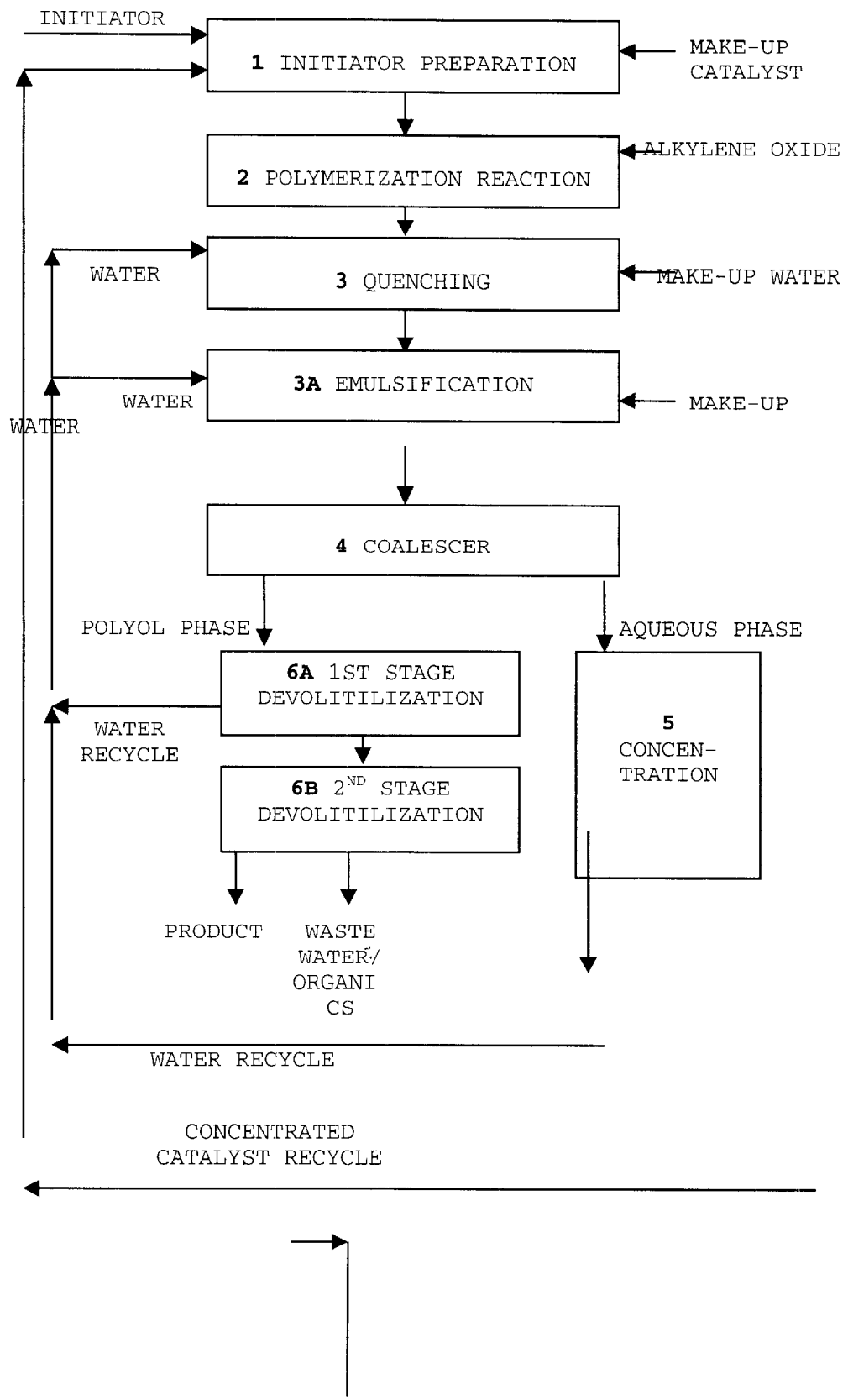

PROCESS FOR PURIFYING POLYETHERS

STATEMENT REGARDING FEDERALLY SPONSORED RESEARCH OR DEVELOPMENT

The research and development leading to the subject matter disclosed herein was not federally sponsored.

BACKGROUND OF THE INVENTION

This invention relates to the production of polyethers, and in particular to a method for purifying a polyether to recover the polymerization catalyst therefrom.

Polyethers are high volume chemical compounds that are used in a wide variety of applications including, for example, the preparation of polyurethanes, making aminated polyethers, and surfactants. A common method of making polyethers is to polymerize an alkylene oxide in the presence of an "initiator compound" and an alkali metal hydroxide catalyst. In this way, polymers of the alkylene oxide can be prepared having a wide variety of molecular weights. The function of the initiator compound is to set the nominal functionality (number of hydroxyl groups per molecule) of the polyether. Sometimes the initiator provides the polyether with certain desirable functional properties. This is true, for example, in the case of many surfactants.

At the conclusion of the polymerization reaction, it is usually necessary to remove the alkali metal catalyst. Various methods for accomplishing this are known in the art. For example, the polyether can be mixed with water and a water-immiscible solvent and then subjected to electrostatic coalescence. The catalyst preferentially migrates to the water phase and the polyether migrates to the solvent phase, thereby achieving a separation of the catalyst from the polyether. However, that method has the substantial drawback of using an organic solvent which in addition to being an additional expense must be removed from the polyether in a separate processing step.

In a variation of the foregoing method, an acid is also added to the crude polyether before electrostatic coalescence or centrifugation. That process still has the problems associated with the use of the solvent. Additionally, the alkali metal catalyst is neutralized by the acid, forming salts that create a separate disposal problem.

Another approach to purifying polyethers is by treatment with an absorbent such as synthetic magnesium silicate and water. The absorbent, which contains the catalyst, is then separated from the polyether and the polyether is subsequently stripped of the water using heat and vacuum. This process is therefore energy-intensive and the catalyst is lost with the absorbent. A variation of this method, in which the water/adsorbent/polyether mixture is treated with carbon dioxide followed by filtration and water stripping, has the same disadvantages.

Ion exchange techniques have also been used to purify polyethers. These techniques have the disadvantages of requiring a solvent to reduce viscosity and the need to regenerate the ion exchange resin. Moreover, the catalyst is lost in the process and must be disposed of.

Another method of purifying polyethers involves mixing the crude polyether with water to form an emulsion, heating the emulsion to about 90° to about 150° C., and then passing the emulsion through a coalescing medium by which the emulsion is broken and separate aqueous and polyether phases are formed. Salts or additional alkali metal hydroxides may be added with the water to promote a greater density difference between the aqueous and polyether phases, thereby facilitating their separation.

Although the coalescing process just described provides certain advantages over other methods, it is desirable to improve the efficiency of the method in order to maximize the amount of alkali metal catalyst that is removed.

The most common catalyst for polyether production is potassium hydroxide (KOH). However, when KOH is used to polymerize propylene oxide to form a polyether, a significant level of monofunctional impurities often are formed by the isomerization of propylene oxide into allyl alcohol. The allyl alcohol acts as a monofunctional initiator for the polymerization of polyether monoalcohols. One method of reducing this undesired isomeration reaction is to use cesium hydroxide (CsOH) as the polymerization catalyst. However, CsOH is many times more expensive than KOH. Hence, for a process using CsOH to be economically viable, it is necessary to minimize the amount of catalyst that is lost during the polyether production.

Accordingly, it would be desirable to provide a process whereby an alkali metal hydroxide can be recovered from a crude polyether, which process does not require the use of organic solvents or absorbents, and which permits for minimal losses of the polyether polymerization catalyst.

BRIEF DESCRIPTION OF THE DRAWINGS

FIG. 1 is a schematic diagram of a preferred overall process for producing and purifying polyethers incorporating several aspects of the invention, and illustrates preferred arrangements for recycling water and alkali metal catalyst.

SUMMARY OF THE INVENTION

In one aspect, this invention is a process for preparing a polyether comprising a) reacting an initiator compound having at least one active hydrogen-containing group with an alkali metal polymerization catalyst to substitute at least a portion of the hydrogen atom(s) of said active hydrogen-containing group(s) with an alkali metal cation to form an alkoxide initiator;

b) reacting said alkoxide initiator with at least one alkylene oxide to form a crude polyether;

c) mixing said crude polyether with water under conditions such that an emulsion forms and said alkali metal polymerization catalyst is converted to the corresponding alkali metal hydroxide dissolved or suspended in said aqueous phase; and d) passing said emulsion through a coalescing medium under conditions such that said emulsion is separated into an aqueous phase containing said alkali metal hydroxide and a polyether phase that is substantially free of said alkali metal polymerization catalyst and e) recycling at least some of said alkali metal hydroxide back into step a).

In a second aspect, this invention is a process for preparing a crude polyether and removing an alkali metal catalyst from said crude polyether, comprising a) polymerizing at least one alkylene oxide in the presence of at least one initiator compound and an effective amount of an alkali metal polymerization catalyst to form a crude polyether;

b) mixing said crude polyether with water under conditions such that an emulsion forms;

c) passing the emulsion through a coalescing medium under conditions such that said emulsion is separated into an aqueous phase containing said alkali metal catalyst and a polyether phase that is substantially free of said alkali metal catalyst, d) stripping residual water from the polyether phase under conditions including subatmospheric pressure and an elevated temperature to produce a partially purified polyether and a water recycle stream that may contain said alkylene oxide but is substantially free of other inorganic impurities, e) recycling at least a portion of said water recycle stream back into step b), and f) treating the partially purified polyether from step d) to remove residual water, allyl alcohol and other organic impurities.

In a third aspect, this invention is a method for preparing a crude polyether in a polymerization reaction and removing an alkali metal catalyst from said crude polyether in a coalescing process, wherein the crude polyether is exposed to a holding period between the completion of the polymerization reaction until the crude polyether is subjected to said coalescing process, comprising a) polymerizing at least one alkylene oxide in the presence of at least one initiator compound and an effective amount of an alkali metal polymerization catalyst to form a crude polyether containing residues of said alkali metal polymerization catalyst;

b) mixing the crude polyether with sufficient water to convert said alkali metal catalyst residues to an alkali metal hydroxide dissolved or suspended in water, thereby forming a mixture of polyether and an aqueous alkali metal hydroxide solution or suspension;

c) subjecting said mixture of polyether and an alkali metal hydroxide solution to conditions, including the addition of more water, if necessary, such that an emulsion forms;

d) prior to or after step c), holding said mixture of polyether and an alkali metal hydroxide solution or suspension for a period of time and then; and e) passing said emulsion through a coalescing medium under conditions such that said emulsion is separated into an aqueous phase containing said alkali metal catalyst and a separate polyether phase that is substantially free of said alkali metal catalyst.

It has been found that when the crude polyether is kept during any holding period between the end of the polymerization reaction and the coalescing step as a mixture with enough water to convert the alkali metal polymerization catalyst to aqueous alkali metal hydroxide, the efficiency of the subsequent coalescing step is improved. This is particularly seen in preferred embodiments in which the aqueous phase is recovered and recycled. This permits easier and more efficient separation of the aqueous and polyether phases, which in turn permits a more complete removal of the alkali metal polymerization catalyst from the polyether. The catalyst can then be recycled, and costs associated with replacing lost catalyst are correspondingly reduced.

In a fourth aspect, this invention is a process for preparing a crude polyether and removing an alkali metal catalyst from said crude polyether, comprising a) polymerizing at least one alkylene oxide in the presence of at least one polyhydric initiator compound and an effective amount of an alkali metal polymerization catalyst to form a crude polyether; and b) mixing said crude polyether with water under conditions such that an emulsion forms; and c) passing the heated emulsion through a coalescing medium under conditions such that said emulsion is separated into an aqueous phase containing said alkali metal catalyst and a polyether phase that is substantially free of said alkali metal catalyst, wherein said process is conducted under a non-oxidizing atmosphere.

This process permits the more efficient separation of the aqueous and polyether phases during the coalescing step, particularly when the water phase is recycled back into the process. As before, the more efficient separation of the aqueous and polyether phases allows for greater recovery of the alkali metal polymerization catalyst from the polyether.

In a fifth aspect, this invention is a method for removing an alkali metal catalyst from a crude polyether, comprising a) mixing a crude polyether containing residues of an alkali metal catalyst with sufficient water to form an emulsion, under conditions such that an emulsion forms and b) contacting the emulsion with a zirconium oxide coalescing medium under conditions such that said emulsion is separated into an aqueous phase containing said alkali metal catalyst and a polyether phase that is substantially free of said alkali metal catalyst.

It has been found that the use of zirconium dioxide as a coalescer medium provides several unique benefits that can lead to important economic advantages. Zirconium dioxide is insoluble in the polyol and in the water/alkali metal catalyst solution, so it has a long bed life. Zirconium dioxide absorbs very little of the polyether polyol, so problems with fouling and loss of product are largely avoided. Zirconium dioxide is preferentially wetted by the water/alkali metal catalyst phase, and thereby provides excellent coalescing efficiency. Further, zirconium dioxide is readily available in particle sizes that are easily adapted to commercial scale production processes.

DETAILED DESCRIPTION OF THE INVENTION

In this invention, a polyether is prepared by reacting an initiator compound with an alkylene oxide in the presence of an alkali metal polymerization catalyst. The preparation of polyethers via alkali-metal catalyzed polymerization of alkylene oxides is well known and, except for features described as critical herein, conventional alkylene oxide polymerization processes may be used to prepare a crude polyether according to this invention.

Accordingly, the alkylene oxide can be any that can be polymerized using an alkali metal polymerization catalyst, including ethylene oxide, propylene oxide, 1,2-butylene oxide, 2,3-butylene oxide, 1,2-hexylene oxide, and the like. Mixtures of two or more of the foregoing alkylene oxides can be used, and two or more of the foregoing alkylene oxides can be sequentially polymerized to form a block structure in the polyether. Ethylene oxide, propylene oxide, 1,2-butylene oxide and 2,3-butylene oxide are generally preferred on the basis of cost, availability and properties of the resulting polyether. Polymers of any of these oxides are preferred polyethers in this invention, provided that the polymer is sufficiently insoluble in water that it can form an emulsion with water that can be broken into separate polyether and aqueous phases via a coalescing step. Mixtures of ethylene oxide with propylene oxide or a butylene oxide isomer are also preferred, as are sequential polymerizations of propylene oxide or a butylene oxide isomer followed by ethylene oxide, and of ethylene oxide followed by propylene oxide or a butylene oxide isomer. Homopolymers of propylene oxide and polymers of mixtures of alkylene oxides containing propylene oxide are most preferred polyethers.

The initiator compound contains one or more active hydrogen-containing groups. As used herein, an active hydrogen-containing group contains a hydrogen bonded to a heteroatom and engages in a ring-opening reaction with an alkylene oxide. A carbon atom from the alkylene oxide becomes bonded to the heteroatom, and a terminal hydroxyl group is formed. Among such active hydrogen-containing groups are carboxylic acid (—COOH), hydroxyl (—OH), primary amine (—$NH_2$), secondary amine(—NRH, where R is alkyl, especially lower alkyl), mercapto (—SH), and the like. The structure of the initiator compound is selected to provide a desired functionality (i.e., number of hydroxyl groups/molecule) in the finished product and in some cases to provide desirable functional properties. For example, an initiator having a hydrophobic group may be selected if surfactant properties are desired in the product polyether. Generally, hydroxyl-group containing initiators having from 1 to 8 hydroxyl groups per molecule are preferred. Among the many suitable initiator compounds are water, glycerine, trimethylol propane, ethylene glycol, diethylene glycol, propylene glycol, dipropylene glycol, low molecular weight poly(alkylene oxides), sucrose, sorbitol, α-methyl glucoside, α-hydroxyethyl glucoside, saturated or unsaturated $C_4$–$C_{22}$ aliphatic carboxylic acids, alkyl-substituted phenols preferably having 4 or more carbons on the alkyl group, such as p-nonyl phenol, alkylene amines, alkylene diamines such as ethylene diamine or diethylene triamine; aminoethylpiperazine; aromatic mono- and polyamines such as toluene diamine and methylene diphenylamine; alkyl mono- and polymercaptans, and the like.

The alkali metal polymerization catalyst is a salt or hydroxide that will displace a hydrogen from an active-hydrogen containing group on the initiator molecule. Suitable polymerization catalysts include alkali metal carbonates, oxides, and salts of organic acids, such as acetates, propionates, and the like. Preferred alkali metal polymerization catalysts are the alkali metal hydroxides, in particular potassium hydroxide, sodium hydroxide, barium hydroxide and cesium hydroxide. Cesium hydroxide is especially preferred, for two main reasons. Cesium hydroxide catalyzes the polymerization reaction under conditions that reduce the amount of isomerization of propylene oxide to form monofunctional impurities. In addition, because this invention provides for efficient recovery and recycle of catalyst, it is of particular interest for use with the relatively expensive cesium catalyst.

The polyether is prepared by mixing the alkylene oxide and initiator compound under polymerization conditions in the presence of the alkali metal catalyst. One method of adding the alkali metal catalyst is to mix a concentrated aqueous solution of the catalyst with some or all of the initiator compound. Such a concentrated aqueous solution advantageously contains from about 20 to about 60 wt.-percent, preferably from about 40 to about 55 wt.-percent of the catalyst. Typically, about 0.04 to about 0.2 moles of catalyst are used per equivalent of active hydrogen atom in the initiator compound. In this way, a portion of the active hydrogen atoms on the initiator are reacted and replaced with alkali metal cations. Because the water will act as a difunctional initiator during the polymerization process, most or all of the water usually is stripped from the initiator/catalyst mixture. However, the water may be left in the initiator if the presence of water-initiated polyether molecules in the final product is acceptable.

The polymerization is suitably conducted at an elevated temperature, for example from about 80° C. to about 150° C. A pressure of from atmospheric to about 100 psig is generally suitable.

At the conclusion of the polymerization reaction, a crude polyether is obtained which contains residual alkali metal catalyst and unreacted alkylene oxide in addition to the polyether. The alkali metal catalyst exists at least partially in the form of terminal alkoxide (—$O^-M^+$, where M represents the alkali metal) groups on the polyether.

In order to remove catalyst from the crude polyether according to the invention, the crude polyether is mixed with sufficient water and under other conditions such that an emulsion of the water and the polyether is formed. This is easily accomplished through agitation, the application of heat, or both. Agitation sufficient to finely disperse the water and polyether into each other can be accomplished using various types of mixing apparatus, such as stirred vessels, pin mixers, in-line agitators, impingement mixers, nozzle mixers, sonic mixers or static mixers. Elevated temperatures assist in producing an emulsion by reducing the viscosity of the polyether. Temperatures of from about 80° C. to about 150° C. are suitable for forming the emulsion, with a temperature of from about 100° C. to about 140° C. being preferred. If a temperature above the boiling point of water is used, increased pressure is preferred in order to prevent boiling.

The amount of water that can be used in making the emulsion can vary widely. As little as about 3%, preferably at least about 5%, more preferably at least about 6% water, based on weight of crude polyether, is used. 100% or more of water can be used, based on the weight of crude polyether, but preferably no more than about 70%, more preferably no more than about 40%, most preferably no more than about 20% of water is used. Using unnecessarily large amounts of water provides little or no benefit and requires the handling of larger volumes of materials.

Upon the formation of said emulsion, the terminal alkoxide (—$O^{-M+}$) groups react with water molecules to form terminal hydroxyl groups and regenerate the corresponding alkali metal hydroxide, which becomes dissolved in the aqueous phase.

If the density of the water is close to that of the polyether, the water phase will separate slowly if at all from the polyether phase. Accordingly, it is within the scope of the invention to add a soluble inorganic salt or hydroxide to the water in order to increase its density relative to that of the polyether phase. Suitable salts include soluble alkali metal salts, particularly potassium sodium or cesium salts. The alkali metal hydroxides are preferred, and it is most preferred to simply use the same alkali metal catalyst that is used in forming the polyether. It is most preferred to use potassium hydroxide, sodium hydroxide, barium hydroxide or cesium hydroxide to increase the density of the water phase when needed. Sufficient salt or hydroxide is added to create a density difference between the water and polyether phases of at least 0.01 g/cc, more preferably at least 0.02 g/cc. Up to about 10%, preferably up to about 5% by weight of soluble salt or hydroxide, based on the weight of the water, is generally sufficient for this purpose. All or a portion of the alkali metal catalyst recycle stream from step 5 in the process as shown in FIG. 1 can be used as a source of catalyst with which to increase the density of the aqueous phase.

Except for water and the optional addition of soluble salt or hydroxide, it is preferred not to include any other additives in the emulsion.

The emulsion is then passed through the coalescer medium. The contact with the coalescer medium causes the finely dispersed droplets of water to coalesce together into larger agglomerations that, by virtue of their higher density relative to the polyether phase, can separate from the polyether to form a distinct water phase. Typically, the product stream leaving the coalescer medium contains enlarged water and polyether droplets, as compared to the mixture that is fed to the coalescer. The product stream is then permitted to settle, whereupon the operation of gravity causes the agglomerated water and polyether droplets to separate into distinct water and polyether phases. The separation process can be promoted by holding the output from the coalescer bed under relatively quiescent conditions. Advantageously, a settling tank or an extension of the coalescer vessel is provided for the product stream from the coalescer bed to be held under relatively quiescent conditions so that this phase separation is completed.

If desired, the emulsion may be contacted with two or more coalescer beds that are connected in series, in order to obtain a more complete separation of the polyether and water phases.

The coalescer medium advantageously is in a form having a high surface area to volume ratio, such as a mesh, a fiber or a particulate. Particulate coalescing media are preferred. When a particulate coalescer is used, the particle size is advantageously selected in conjunction with the density so that (1) the bed does not become fluidized, shift or develop uneven flow distribution (2) a suitable pressure drop is developed across the coalescer bed, and (3) efficient coalescence is obtained. Particle sizes in the range of 10 to about 140 mesh, preferably from about 20 mesh to 70 mesh (U. S. Standard), are advantageous for inorganic coalescing media.

It is preferred to contact the emulsion with the coalescing medium at an emulsion temperature of from about 80° C. to about 150° C., preferably about 100 to about 140° C. Operating at elevated temperatures provides several advantages. One is that viscosity is reduced at those temperatures, relative to lower temperatures. Another advantage of working in these temperature ranges is that the difference in the densities of the aqueous and polyether phases is usually greater than it is at lower temperatures. A third advantage is that the polyether tends to be less soluble in water at the elevated temperatures. As before, if temperatures above about 100° C. are used, it is preferred to use superatmospheric pressures in order to avoid boiling.

It is especially preferred that the depth of the bed be chosen in combination with the selection of coalescer medium so that a pressure drop of at least 5 psig is seen across the bed. For commercial scale polyether production using a particulate coalescer medium such as particulate zirconium dioxide, a coalescer bed from about 5 inches to 20 feet in depth, preferably from about 10 inches to about 5 feet in depth, is suitable. A somewhat deeper bed may be used if the emulsion is particularly difficult to break, such as occurs, for example, when the polyether is especially compatible with the water. Reduced flow rates can also help separate emulsions that are difficult to break. The diameter of the bed is advantageously selected in commercial applications to provide for a flux across the surface of the bed in the range from about 800 to 2000 lbs/hr/ft$^2$.

In this manner, separate aqueous and polyether streams are obtained. The aqueous stream contains at least about 90% by weight, preferably at least about 95%, more preferably at least about 98%, most preferably at least about 99% of the alkali metal polymerization catalyst originally contained in the crude polyether. The polyether phase will contain a small amount of water and residual amounts of catalyst. Often, it contains small amounts of organic by-products.

In one aspect of this invention, improved efficiency of the overall process for making polyethers is achieved by recycling at least a portion of the alkali metal catalyst that is recovered from the purification of the crude polyether back into the beginning of the overall process (step 1 in FIG. 1). When it is desired to add an alkali metal salt into the step of emulsifying the crude polyether, a portion of the recovered alkali metal catalyst may be recycled back into that step as well. The recycling is preferably done by removing at least a portion of the water from the water/alkali metal hydroxide stream obtained from the coalescer to form a concentrated alkali metal hydroxide stream. This is shown in step 5 in FIG. 1. However, it is within the scope of the invention to dispense with the concentration step, and recycle the recovered aqueous alkali metal hydroxide solution obtained from the coalescing step directly back into the process.

Similarly, it is desirable to recover residual water from the polyol phase and recycle it, so that the volume of any waste stream that must be disposed of or treated is minimized.

In FIG. 1, initiator and a concentrated aqueous alkali metal solution are mixed in step 1. As discussed above, step 1 will typically include a stripping step (not shown) to remove water. In step 2, the initiator/catalyst mixture is reacted with one or more alkylene oxides to form a crude polyether of the desired molecular weight. The crude polyether is then mixed with water in optional but preferred quenching step 3 and/or emulsification step 3*a* to form an emulsion that is passed through a coalescer in step 4. Separate polyether and aqueous streams are obtained from the coalescing step. As shown in step 5 of FIG. 1, the aqueous phase can be concentrated, generating a concentrated catalyst stream and a water stream. As shown, the concentrated catalyst stream can be recycled back to step 1. As mentioned before, the concentration step is optional, but preferred.

The step of concentrating the alkali metal hydroxide stream can be accomplished in any convenient manner, such as by application of heat and/or vacuum. Suitable conditions include a temperature of about 60–120° C. and a reduced pressure of from about 10 to about 400 mm Hg. Of course, the concentration step may be carried out as a series of stages, each stage taking the concentrated alkali metal hydroxide solution from the previous stage and concentrating it further until an alkali metal hydroxide solution of the desired concentration is obtained. The water content in the alkali metal hydroxide stream is advantageously reduced to below about 80% by weight, preferably below about 70% by weight, more preferably to about 40–60% by weight. Reducing the water content to this level minimizes the amount of water that is introduced into, and subsequently must be removed from, the initiator. A portion of the alkali metal hydroxide may be recycled back into steps 3 or 3*a* or both. This is preferred when it is desirable to increase the density of the aqueous phase of the emulsion in order to facilitate its separation from the polyether phase, as described before.

The water recovered by concentrating the alkali metal hydroxide stream is also advantageously recycled back into the process. As shown in FIG. 1, some or all of this water is advantageously recycled from concentration step 5 back into optional quenching step 3 and/or emulsification step 3A.

Examples A and B demonstrate the effects of alkali metal catalyst recovery and recycle according to the first aspect of the invention. Example A is a polyether made using fresh cesium hydroxide catalyst. Example B is a polyether made using cesium hydroxide catalyst that is recovered from polyether A and recycled. Both polyethers are poly (propylene oxide) homopolymers made by polymerizing propylene oxide onto a propoxylated glycerine initiator. To remove catalyst from the crude Example A, the crude polyether is mixed with 12% by weight water at a temperature of about 120° C. The resulting emulsion is coalesced by passing it at the rate of about 80 liters/hour through a four-inch diameter coalescer bed containing particulate zirconium dioxide having an approximate particle size of 20×50 mesh. These conditions provide an approximate flux of 2000 pounds/hr/ft$^2$ through the coalescer medium. An extension of the coalescer vessel below the bed provides a quiescent zone for the polyether and aqueous phases to separate. A stream containing an aqueous cesium hydroxide solution is collected from a run down vessel and recycled back to the reactor to prepare the initiator used for Example B. Crude polyether Example B is then coalesced in the same manner. Except for the use of recycled CsOH, polyethers A and B are prepared in the same manner.

Certain processing conditions and properties of Examples A and B are compared in the following Table 1:

TABLE 1

| Property | Example A (fresh CsOH) | Example B (recycled CsOH) |
| --- | --- | --- |
| % OH | 1.34 | 1.43 |
| Viscosity (cSt) | 628 | 605 |
| Total Unsaturation (meq/g) | 0.031 | 0.025 |
| Propenyl Unsaturation (meq/g) | 0.015 | 0.011 |
| Ppm CsOH, crude polyether | 8540 | 8285 |
| Ppm CsOH, polyether from coalescer | 90 | 80 |
| % CsOH removal in coalescing step | 98.9 | 99.3 |

As shown in the foregoing table, use of CsOH recycled from the coalescing step permits for the production of a polyol having the same properties, within typical production variations, as are obtained using fresh CsOH. In addition, the recycled CsOH can be removed from the product polyether without loss of coalescer efficiency.

In this invention, the polyether stream exiting the coalescing step will usually contain residual amounts of water, catalyst and other impurities. The polyether stream may therefore be devolatilized to remove water and low molecular weight organic impurities. Devolatilization is performed by subjecting the polyether to an elevated temperature, reduced pressure or a combination thereof. In another aspect of this invention, the polyether is devolatilized in at least two stages so that more water can be recovered and recycled. Thus, as shown in FIG. 1, a first stage devolatilization is conducted as step 6A, and water is withdrawn and recycled back to steps 3 and/or 3A. The partially devolatilized polyether is then subjected to a second devolatilization step 6B which is conducted under more stringent conditions, creating a product polyether stream and a waste water/organic stream that is discarded or treated. The product polyether stream may be subjected to supplemental clean up to remove residual catalyst or water, such as by passing it through a bed of a suitable absorbent such as magnesium silicate.

In the first stage devolatilization, conditions are selected so that water is stripped from the polyether, but allyl alcohol and other organic impurities therefore remain in the polyether. If desired, the stripping conditions in the first stage devolatilization may be selected so that any residual alkylene oxide in the polyether is stripped along with the water. In this manner, a water stream is generated that is substantially free of allyl alcohol and other organic impurities (except for alkylene oxide), preferably containing less than 1000 ppm thereof and more preferably no more than trace quantities thereof. As such, this water stream is suitable for recycle back into the polyether production process. Any residual alkylene oxide that is present in the aqueous phase may be recycled with the water. FIG. 1 illustrates the recycle of this water stream back into quenching step 3 and emulsification step 3A. Suitable conditions for this first devolatilization step include a temperature of from about 100 to about 140° C. and a reduced pressure of from above 20 to about 200 mm Hg. The first stage devolatilization is advantageously conducted until as much water as possible is stripped from the polyether without stripping significant quantities of allyl alcohol or other organic impurities (although, as mentioned before, the alkylene oxide(s) can be stripped with the water in this step). This permits the recovery and recycle of a maximum amount of water.

After the first stage devolatilization is completed, the polyether will usually contain residual amounts of water as well as low molecular weight organic impurities. These are removed in a second devolatilization stage, which is conducted under conditions stringent enough that organic impurities having a molecular weight of up to about 250 are stripped out, together with essentially all of the remaining water. Typical conditions for this second stage devolatilization include a temperature of from about 100° C. to about 140° C. and a reduced pressure of from about 3 to about 20 mm Hg.

The second stage devolatilization produces a water/organic waste stream that is generally unsuitable for recycle. However, because most of the water in the polyether stream from the coalescing step is recovered in the first devolatilization stage, the volume of the water in the waste stream from the second devolatilization stage is minimized. This permits a minimum quantity of water to be sent to a wastewater treatment facility or to be disposed of.

The third aspect of this invention involves what can be called a "quenching" step. This third aspect may be used in conjunction with the catalyst recycle of the first aspect or the two-stage devolatilization of the second aspect, but it may also be used independently of either or both of those other aspects of the invention.

According to this aspect, the "quenching" step is performed on the crude polyether whenever there is a period of time during which the crude polyether is stored or held prior to conducting the coalescing step. It is often necessary to store the crude polyether because of the methods in which the polymerization and coalescing steps are accomplished. The step of passing the water/polyether emulsion through the coalescer bed is typically and preferably performed continuously. On the other hand, the alkylene oxide polymerization to form a polyether is more typically performed in a batch process, particularly when the polyether has a molecular weight of about 500 or more. This difference in the two processes leads to a situation in which crude polyether periodically becomes ready for the coalescing step but cannot be coalesced immediately because the coalescing step is performed continuously and because there are usually limitations in equipment capacity. As a result, much of the batch of crude polyether must be stored for a period as it awaits the coalescing step. In commercial production process, this period may range from about 1 hour, more typically 4 hours, and even more typically 8 hours, up to several days or longer.

It has been found that improved coalescer performance is achieved if the crude polyol is stored in the form of a mixture with water during any holding period between the end of the polymerization reaction and the subsequent coalescing step. This improvement is especially seen when the water stream obtained from the coalescing step is recycled back into earlier steps of the process. Although this invention is not limited by any theory, it is believed that the crude polyether, having —O$^-$M$^+$ end-groups, is particularly prone to oxidation to form carboxyl group-containing impurities. It is believed that these carboxyl group-containing impurities act as surfactants in the polyether/water emulsion. These surfactants tend to help solubilize the polyether and water phases in each other, thereby making it more difficult to obtain a clean separation of the polyether from the water. The surfactant molecules build up in the system as the water phase is recycled and over time cause increasing difficulty in separating the polyether and water phases. It is further believed that by "quenching" the crude polyether in water, the alkali metal catalyst is converted to the corresponding hydroxide in aqueous solution. The end groups on the crude polyether are simultaneously converted to hydroxyl groups. It is believed that the oxidation of the polyether to form carboxyl group-containing impurities is inhibited when the crude polyether has been quenched as described. This leads to a reduction in the rate at which surfactant molecules are formed, and thereby provides for a more efficient operation of the coalescer bed.

Accordingly, the amount of water that is used in the "quenching" step is sufficient to convert substantially all of the —O$^-$M$^+$ groups in the crude polyether to hydroxyl groups and to convert substantially all of the alkali metal ions to alkali metal hydroxide in aqueous solution. Generally, from about 0.5 to about 4 percent of water, based on the weight of the crude polyether is sufficient to obtain the desired effect. In order to avoid the removal of unnecessary amounts of water, it is desirable not to use more water than is needed to form the polyether/water emulsion that is subjected to the coalescing step. However, a somewhat lesser quantity of water may be used in the quenching step, with any additional water as may be needed to conduct the coalescing step being added just before the coalescing step is performed.

In FIG. 1, the quenching step is shown at 3 as a separate step from the emulsification step 3A, with separate water streams being added to the crude polyether in each of the steps. However, it is not necessary that separate quenching and emulsification steps be performed, as in the case where sufficient water is added in step 3 (the quenching step) to form an emulsion suitable for passing through the coalescer. The critical aspect of the quenching step is that the polyether be contacted with sufficient water, as discussed above, during any period of storage between the end of the polymerization step and the coalescing step.

Thus, in the ordinary commercial production of a polyether a batch of crude polyether is typically transferred from a batch reactor vessel into a holding vessel where it awaits the coalescing step. The polyether is advantageously combined with water as discussed above during the time it resides in the holding vessel. If additional water or other conditions are necessary for the completion of the emulsification step, these can be performed while the polyether awaits the coalescing step the holding vessel, or can be performed in a separate step just prior to the coalescing step. The quenched polyether can be and preferably is subjected to thorough mixing, thus maximizing the conversion of —O$^-$M$^+$ groups to hydroxyl groups during the holding period. This mixing may result in the formation of a single-phase mixture, or an emulsion having aqueous and polyether phases. When an emulsion is formed, this same emulsion can be fed through the coalescing medium and separated into its component phases.

In the fourth aspect of the invention, the performance of the coalescing step is improved by conducting the polymerization, emulsification and coalescing steps under a non-oxidizing atmosphere. If the quenching step is employed, that step is conducted under a non-oxidizing atmosphere as well.

Although this invention is not limited by any theory, it is believed that coalescer performance is adversely affected by the formation of surfactant molecules in the polyether/water mixture. These surfactant molecules are believed to form by the oxidation of polyether molecules in the presence of the alkali metal hydroxide catalyst. Accordingly, in this aspect of the invention, maintaining the crude polyether under a non-oxidizing atmosphere reduces the formation of oxidized polyether surfactant molecules. Preferably, all liquid streams that come into contact with the crude polyether, including recycled alkali metal hydroxide solution and water, are maintained under an inert atmosphere throughout the process. This prevents dissolved or entrained oxygen from being introduced into the process from those sources.

Referring to FIG. 1, in this aspect of the invention, at least steps 1, 2, 3 (if practiced), 3A and 4 are performed under an inert atmosphere. Preferably, steps 5 and 6A are also performed under an inert atmosphere, and in an especially preferred process, recycle lines from steps 5 and 6A back to previous steps in the process are also maintained under an inert atmosphere. In the most preferred process, all streams entering the process are maintained under the inert atmosphere.

Suitable non-oxidizing atmospheres include nitrogen, argon, helium and the like, with nitrogen being preferred on the basis of cost, ready availability and ease of use.

A large number of coalescer media can be used in the process of this invention, including, for example, sand, activated carbon, ground carbon anodes, stain steel particulate, ceramics, fibers, and the like. However, the coalescer medium is advantageously characterized by the following attributes:

1. Substantially impervious to attack by the polyol, water or alkali metal catalyst.
2. Stable to temperatures up to about 150° C.
3. Preferentially wetted by the aqueous phase.
4. Sufficient density, taken together with particle size, that (1) the bed does not become fluidized, shift or develop uneven flow distribution (2) a suitable pressure drop is developed across the coalescer bed, and (3) efficient coalescence is obtained.
5. Resistant to physical degradation under the conditions of the coalescing operation.
6. Does not absorb organic impurities.

A coalescing medium that meets all of the foregoing criteria is zirconium dioxide. Zirconium dioxide is advantageously used in the form of a particulate having a particle size in the range from about 10 mesh to about 140 mesh, preferably between 20 and 70 mesh, U. S. sieve (i.e., between about 0.84 and 0.21 mm effective diameter). Zirconium dioxide has the additional advantage of providing for a long bed life. Because the use of a particulate zirconium dioxide coalescing medium provides for a particularly efficient separation of the aqueous and polyether phase in the coalescing step, its use is particularly suitable when the alkali metal is cesium hydroxide.

Examples 1–6 demonstrate the use of a 20–50 mesh zirconium dioxide coalescer medium to break a water/polyether emulsion and recover alkali metal catalyst. The equipment and general coalescing conditions are as described above with respect to Examples A and B.

Specific conditions and results are as reported in Table 2.

TABLE 2

| Property | Example No. | | | | | | |
|---|---|---|---|---|---|---|---|
| | 1 | 2 | 3 | 4 | 5 | 6 | 7 |
| Catalyst | KOH | CsOH | CsOH | CsOH | CsOH | CsOH | CsOH |
| Polyol Type | Random PO/EO | Random PO/EO | PO | PO/EO cap | PO/EO cap | PO/EO cap | PO/EO cap |
| % EO | 12 | 12 | 0 | 14.5 | 14.5 | 14.5 | 14.5 |
| Hydroxyl equivalent weight | 1150 | 1150 | 1250 | 2450 | 2200 | 1800 | 2250 |
| Viscosity (25° C., cSt) | 555 | 543 | 625 | 1730 | 1470 | 1155 | 1300 |
| % Water added to form emulsion | 12 | 12 | 12 | 9 | 6 | 6 | 6 |
| Coalescing Temperature (° C.) | 120 | 120 | 120 | 130 | 120 | 120 | 120 |
| Approximate Flux (lb./hr/ft$^2$) | 1200 | 1200 | 1900 | 1500 | 2000 | 2000 | 2000 |
| Catalyst conc., crude polyether (ppm) | 3100 | 7500 | 8450 | 6100 | 7200 | 8400 | 6700 |
| Catalyst conc., purified polyether (ppm) | 85 | 90 | 40 | 400 | 200 | 240 | 220 |
| % catalyst recovered | 97.3 | 98.8 | 99.5 | 93.4 | 97.2 | 97.1 | 96.7 |

As shown in FIG. 1, zirconium dioxide is an effective coalescing medium for use with a variety of polyether types and for use with either potassium hydroxide and cesium hydroxide. Note that the polyol examples 1 and 2 are nominally duplicates, differing only in the selection of alkali metal polymerization catalyst. Because cesium hydroxide has a higher molecular weight than potassium hydroxide, a greater weight of it is needed to provide the same number of moles. However, the use of the zirconium dioxide coalescing medium allows for recovery of the cesium hydroxide to virtually the same level, on a weight basis, as is achieved with potassium hydroxide.

In all instances except Example 4, alkali metal removal from the polyether exceeds 95%, even using non-optimized conditions. In Example 4, the slightly poorer recovery is believed to be due to the higher viscosity of the polyether. These results can be improved through optimization of the coalescing conditions.

What is claimed is:

1. A process for preparing a polyether comprising
   a) reacting an initiator compound having at least one active hydrogen-containing group with a cesium polymerization catalyst to substitute at least a portion of the hydrogen atom(s) of the active hydrogen-containing group(s) with a cesium cation to form an alkoxide initiator;
   b) reacting the alkoxide initiator with at least one alkylene oxide to form a crude polyether;
   c) mixing the crude polyether with water under conditions such that an emulsion forms, the remainder cesium polymerization catalyst is converted to cesium hydroxide and terminal cesium alkoxide groups on the crude polyether react with water to regenerate cesium hydroxide, the cesium hydroxide being dissolved or suspended in the aqueous phase; and
   d) passing the emulsion through a zirconium dioxide coalescing medium under conditions such that the emulsion is separated into an aqueous phase containing the cesium hydroxide and a polyether phase that is substantially free of the cesium polymerization catalyst and terminal cesium alkoxide groups on the crude polyether, and
   e) recycling at least some of the cesium hydroxide obtained in step d) back into step a).

2. The process of claim 1 wherein the aqueous phase containing the cesium hydroxide obtained in step d) is concentrated by removing water to form a concentrated cesium hydroxide solution, and the concentrated cesium hydroxide solution is recycle ed in step e).

3. The process of claim 2 wherein at least a portion of the water removed from the aqueous phase containing the cesium hydroxide is recycled and used in step c) to form the emulsion.

4. A process for preparing a crude polyether and removing a cesium catalyst from the crude polyether, comprising
   a) polymerizing at least one alkylene oxide in the presence of at least one initiator compound and an effective amount of a cesium polymerization catalyst to form a crude polyether;
   b) mixing the crude polyether with water under conditions such that an emulsion forms;
   c) passing the emulsion through a zirconium dioxide coalescing medium under conditions such that the emulsion is separated into an aqueous phase containing the cesium catalyst and a polyether phase that is substantially free of the cesium catalyst, d) stripping residual water from the polyether phase under conditions including subatmospheric pressure and an elevated temperature to produce a partially purified polyether and a water recycle stream that may contain the alkylene oxide but is substantially free of other inorganic impurities, e) recycling at least a portion of the water recycle stream back into step b), and f) treating the partially purified polyether from step d) to remove residual water, allyl alcohol and other organic impurities.

5. The process of claim 4, wherein the alkylene oxide comprises propylene oxide.

6. The process of claim 5, wherein cesium catalyst from the aqueous phase containing cesium catalyst obtained in step c) is recycled into step a).

7. A method for preparing a crude polyether in a polymerization reaction and removing a cesium catalyst from the crude polyether in a coalescing process, wherein the crude polyether is exposed to a holding period between the completion of the polymerization reaction until the crude polyether is subjected to the coalescing process, comprising a) polymerizing at least one alkylene oxide in the presence of at least one initiator compound and an effective amount of a cesium polymerization catalyst to form a crude polyether containing residues of the cesium polymerization catalyst;

b) mixing the crude polyether with sufficient water to convert the cesium catalyst residues to cesium hydroxide dissolved or suspended in water, thereby forming a mixture of polyether and an aqueous cesium hydroxide solution or suspension;

c) subjecting the mixture of polyether and cesium hydroxide solution to conditions, including the addition of more water, if necessary, such that an emulsion forms;

d) prior to or after step c), holding the mixture of polyether and cesium hydroxide solution or suspension for a period of time and then; and e) passing the emulsion through a zirconium dioxide coalescing medium under conditions such that the emulsion is separated into an aqueous phase containing the cesium catalyst and a separate polyether phase that is substantially free of the cesium catalyst.

8. The process of claim 7 wherein the holding period between the completion of the polymerization reaction until the crude polyether is subjected to the coalescing process is at least 4 hours.

9. The process of claim 8 wherein at least some of the cesium catalyst from the aqueous phase containing cesium catalyst obtained in step e) is recycled back into step a).

10. The process of claim 9, which is conducted under non-oxidizing atmosphere.

11. A process for preparing a crude polyether and removing a cesium catalyst from the crude polyether, comprising a) polymerizing at least one alkylene oxide in the presence of at least one polyhydric initiator compound and an effective amount of a cesium polymerization catalyst to form a crude polyether;

and b) mixing the crude polyether with water under conditions such that an emulsion forms; and c) passing the emulsion through a coalescing medium under conditions such that the emulsion is separated into an aqueous phase containing the cesium catalyst and a polyether phase that is substantially free of the cesium catalyst, wherein the process is conducted under a non-oxidizing atmosphere.

* * * * *